United States Patent
Marshall et al.

(10) Patent No.: US 10,049,052 B2
(45) Date of Patent: Aug. 14, 2018

(54) DEVICE HAVING A CACHE MEMORY

(71) Applicants: Ray Charles Marshall, Harpenden (GB); Joachim Fader, Munich (DE); Stephan Herrmann, Markt Schwaben (DE)

(72) Inventors: Ray Charles Marshall, Harpenden (GB); Joachim Fader, Munich (DE); Stephan Herrmann, Markt Schwaben (DE)

(73) Assignee: NXP USA, Inc., Austin, TX (US)

( * ) Notice: Subject to any disclaimer, the term of this patent is extended or adjusted under 35 U.S.C. 154(b) by 733 days.

(21) Appl. No.: 14/524,378

(22) Filed: Oct. 27, 2014

(65) Prior Publication Data
US 2016/0117255 A1    Apr. 28, 2016

(51) Int. Cl.
*G06F 12/08* (2016.01)
*G06F 12/0897* (2016.01)
*G06F 12/0804* (2016.01)

(52) U.S. Cl.
CPC ...... *G06F 12/0897* (2013.01); *G06F 12/0804* (2013.01); *G06F 2212/1056* (2013.01)

(58) Field of Classification Search
CPC ....... G06F 112/0897; G06F 112/08042; G06F 2212/1056; G06F 12/0891
See application file for complete search history.

(56) References Cited

U.S. PATENT DOCUMENTS

| | | | | |
|---|---|---|---|---|
| 5,392,422 A * | 2/1995 | Hoel | ............. | G06F 13/364 710/113 |
| 6,438,672 B1 * | 8/2002 | Fischer | ............. | G06F 12/0638 711/202 |
| 6,718,439 B1 * | 4/2004 | Jayavant | ............. | G06F 12/0864 711/128 |
| 6,751,700 B2 * | 6/2004 | Donoghue | ............. | G06F 12/0835 711/128 |
| 6,877,063 B1 * | 4/2005 | Allegrucci | ............. | G06F 12/0638 326/38 |
| 7,114,031 B2 * | 9/2006 | Lin | ............. | G06F 12/0808 711/100 |

(Continued)

FOREIGN PATENT DOCUMENTS

EP    0567708 A1    11/1993

OTHER PUBLICATIONS

Requirement for Restriction/Election dated Jan. 25, 2018 for U.S. Appl. No. 14/980,902, 6 pages.
(Continued)

*Primary Examiner* — Hiep T Nguyen

(57) ABSTRACT

A device has a cache memory for temporarily storing contents of a buffer memory. The device has a mirror unit coupled between the cache memory and the buffer memory. The mirror unit is arranged for providing at least two buffer mirrors at respective different buffer mirror address ranges in the main address range by adapting the memory addressing. Due to the virtual mirrors data on a respective address in any of the respective different buffer mirror address ranges is the data of the buffer memory at a corresponding address in the buffer address range. The device enables processing of a subsequent set of data in the buffer memory via the cache memory without invalidating the cache by switching to a different buffer mirror.

16 Claims, 3 Drawing Sheets

(56) References Cited

U.S. PATENT DOCUMENTS

| | | |
|---|---|---|
| 7,657,667 B2 | 2/2010 | Johns et al. |
| 8,473,667 B2 | 6/2013 | Mejdrich et al. |
| 2006/0230239 A1* | 10/2006 | Blumrich ............ G06F 12/0822 |
| | | 711/146 |
| 2007/0283037 A1* | 12/2007 | Burns ................... G06F 9/3802 |
| | | 709/238 |
| 2012/0324430 A1* | 12/2012 | Agarwal .................. G06F 8/51 |
| | | 717/151 |
| 2014/0297919 A1 | 10/2014 | Nachimuthu et al. |
| 2014/0359203 A1* | 12/2014 | Tipton .................. G06F 3/0619 |
| | | 711/103 |
| 2015/0138884 A1* | 5/2015 | Park ...................... G06F 13/385 |
| | | 365/185.08 |
| 2016/0140042 A1 | 5/2016 | Mukherjee |

OTHER PUBLICATIONS

Final Office Action dated Jun. 14. 2018 for U.S. Appl. No. 14/980,902 27 pages.

* cited by examiner

DEVICE HAVING A CACHE MEMORY

FIELD OF THE INVENTION

This invention relates to a device having a cache memory for temporarily storing contents of a buffer memory having a buffer address range. The invention further relates to an integrated circuit comprising at least one such device, a processing system for processing transient data comprising at least one such device, a method of processing transient data for use in a such device, a computer program product comprising instructions for causing a programmable apparatus comprising such device to perform a method of processing transient data and a non-transitory tangible computer readable storage medium comprising data loadable in a programmable apparatus comprising such device. Transient data for example is a large data set that continually changes, like incoming video data.

BACKGROUND OF THE INVENTION

In data processing systems a processor may be coupled to a main memory via a cache memory. The cache memory is for temporarily storing duplicates of data for respective addresses in the main address range so that future requests for data at one of the respective addresses are served faster. In the main memory range various memories may be present, for example a non-volatile program memory, a volatile data memory, registers. A buffer memory may be located in the main memory address range, the buffer directly receiving transient data to be processed from an external source.

For example, vision applications may use fine pixel resolution cameras, which receive a frame of image data every 33 ms (30 frames per second). Each frame from a high resolution camera may, for example, be 6 Mbytes of data. As a processor processes this data via a cache memory, the data may be loaded into such cache memory. Once image processing is complete on that frame of data, the processor may start processing of a next frame of data which was written into the buffer. If the cache memory is not updated, old data may accidentally be used. Hence, a drawback of such a device is that the cache must be invalidated to ensure the processor works on the new frame data and not the stale frame data in the cache.

SUMMARY OF THE INVENTION

The present invention provides a device, an integrated circuit, a method, a computer program product and a non-transitory tangible computer readable storage medium as described in the accompanying claims.

Specific embodiments of the invention are set forth in the dependent claims. Aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings.

Elements in the figures are illustrated for simplicity and clarity and have not necessarily been drawn to scale. In the figures, elements which correspond to elements already described may have the same reference numerals.

DETAILED DESCRIPTION OF THE PREFERRED EMBODIMENTS

In the examples in this document the device is used in a digital processor designed for use in a processing system for transient data, for example a vision application, but the device may be used in any other field requiring a processing of subsequent instances of changing data which are processed using a cache memory. To ensure the processing system is using the most current data, the stale data in the cache must somehow be discarded to allow the fresh data to be loaded. This is called cache invalidation. As such, various methods for cache invalidation are known, while each of those methods has disadvantages.

For example, a first method of cache invalidation uses complete cache invalidation when new data arrives, for example invalidating two levels called L1 and L2 in a hierarchical cache memory. Such cache memories may have a mechanism to flush the entire cache, e.g. to invalidate every cache line in a single operation. However, this may take several hundred clock cycles of a controller performing the flush procedure. Moreover, this has the unwanted side effect that also data and instructions which are still valid are flushed, which may cause a significant impact on the processing performance.

For example, a second method of cache invalidation uses specific cache line invalidation. Such a cache may have a mechanism to selectively invalidate a cache line based on a cached address. However, this requires software to execute cache line invalidate instructions for every address that is to be invalidated. If a cache line is 256 bits long, and the data region to be invalidated is 6 Mbytes, the cache line invalidate instruction would need to be executed 192000 times. This may be very time consuming.

For example, a third method of cache invalidation uses cache snooping or coherency logic. Such additional hardware can be added to the cache memory and the additional hardware tracks when fresh data is written to an external buffer. If so, the hardware automatically invalidates the cache line associated with that fresh data. While efficient for software, the hardware is rather expensive and complex.

In the following embodiments a system is proposed that is very efficient for both hardware and software.

Figure 1:
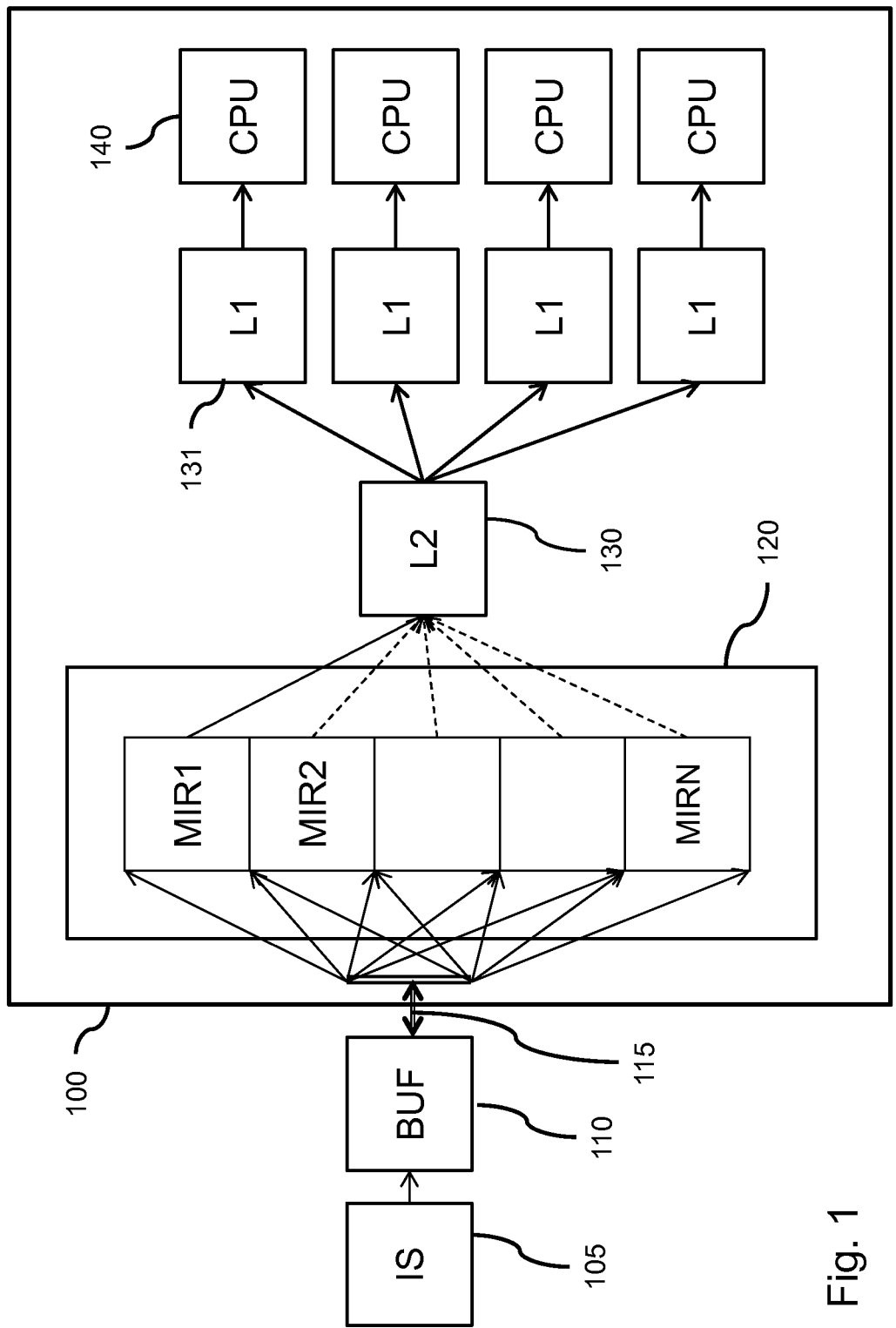
FIG. 1 shows an example of a device having a cache memory and several memory mirrors.

FIG. 1 shows an example of a device having a cache memory and several memory mirrors. The device 100 has a cache memory 130 for temporarily storing data from a main memory which has a main address range. The cache memory is shown to include a second level cache L2 and four first level caches L1, as discussed later. The device is coupled to a buffer memory BUF 110 via a data bus 115 comprising data and address lines for accessing the contents of the buffer memory. The buffer memory may also be implemented as a part of the device. The buffer memory 110 has a buffer address range, e.g. a range of consecutive addresses spanning the size of the buffer memory, starting at a base address in the main address range. The cache memory is for storing duplicates of data for respective addresses in the main address range so that future requests for data at one of the respective addresses are served faster. The device has a mirror unit 120 coupled between the cache memory and the buffer memory 110. The mirror unit provides, by adapting the memory addressing, at least two buffer mirrors at respective different buffer mirror address ranges in the main address range, shown as address ranges marked MIR1, MIR2, . . . , MIRN. It is to be noted that the memory mirrors are virtual; there is no extra memory. The memory mirror is an alias for the buffer memory, e.g. a series of different addresses for the same buffer memory region. Due to the virtual mirrors data on a respective address in any of the respective different buffer mirror address ranges is the data of the buffer memory at a corresponding address in the buffer address range. So the mirror unit provides data on a respective address in any of the respective different buffer mirror address ranges, which is data of the buffer memory at a corresponding address in the buffer address range.

Each mirror address range has at least the same size as the buffer address range, usually the mirror address range will have the same size as the buffer address range. Thereby the mirror unit enables processing of a subsequent set of data in the buffer memory via the cache memory while avoiding using data of a preceding set of data by switching to a different buffer mirror. By using a different buffer mirror, the address of the buffer memory appears to be different, therefore the caches don't find corresponding data in the cache based on the address and so reloads the fresh data from buffer memory and casts out the stale data from cache. A processor 140 may be included in the device. The Figure shows, by way of example, 4 central processing units (CPU) coupled to the cache memory via respective first level cache sections 131 marked L1.

The mirror unit 120 effectively causes the cache memory into experiencing accessing different data when processing subsequent sets of data from the buffer memory. Thereto the mirror unit provides a different memory address for the same region of buffer memory. The mirror unit is mirroring the address range of the buffer memory where a frame of data is stored, onto different buffer mirror address ranges several times. A processor 140 will now see different data addresses for subsequent sets of transient data. So the same memory appears at several addresses through the processor address map. While each frame of data arrives in the same memory space of the buffer memory, a central processor unit CPU accesses each frame of data at a different address.

In an embodiment the processor is arranged for cyclically switching through a sequence of available different buffer mirrors, while processing subsequent sets of data in the buffer memory. The number of available different buffer mirrors may differ, as elucidated below. The processor is arranged to using a next buffer address range when a next frame of data is to be processed. The processor may be triggered into processing the next frame in various ways, e.g. by an external synchronization signal or a timer.

In an embodiment the device has a buffer status unit for storing a buffer status indicative of a subsequent set of data being available in the buffer memory. The processor may be triggered into processing the next frame based on the buffer status.

In the exemplary embodiment of FIG. 1 the device has a processor CPU 140 which is coupled to the cache memory. The processor may be arranged for switching to a different buffer mirror for processing of a subsequent set of data in the buffer memory via the cache memory while avoiding using data of a preceding set of data. The device may have multiple processors as shown all marked CPU, for example N being an integer, e.g. 4 or 8. The N processors may be each arranged for accessing a different buffer mirror for processing of a subsequent set of data in the buffer memory via the cache memory. Different architectures may be used, e.g. all (or 2 out of 4 etc.) processors work on the same set of data, or on respective separate sets of data. To avoid using data of a preceding set of data, the cache memory may have a size of at least N buffer mirrors.

In an embodiment, the cache memory may be subdivided in a first level cache and a second level cache. The first level is shown in the Figure by a first level cache 131 marked L1, the first level cache being coupled to a respective processor. The second level is shown in the Figure by a second level cache marked L2, the second level cache being coupled to the mirror unit 120.

In an embodiment the device comprises N processors. The processors may be arranged to sequentially process subsequent sets of data. To accommodate a data set that has a size of the frame buffer, the first level cache may be subdivided as shown and respective sections marked L1 are coupled to respective processors. Typically, the cache memory is much smaller than the buffer mirror. L1 is normally 8-16× smaller than L2. L2 is normally smaller than the buffer range. However, the first level cache memory may have a size of at least one buffer mirror. If so, the processor coupled to such first level cache may continue working on the respective frame of data while further frames are processed simultaneously by the further processors. Each processor may have a respective first level cache. Also, the second level cache L2 may be large enough to contain N sets of buffer data simultaneously in additional to other data being accessed via the cache.

A cache is a component that transparently stores data so that future requests for that data can be served faster. The data that is stored within a cache might be duplicates of original values that are stored in the buffer memory or other data. If a request is for data that is contained in the cache this may be called a cache hit. Such request can be served by reading the cache, which is faster than reading the main memory. Otherwise, usually called a cache miss, the data has to be recomputed or fetched from its original storage location, which is comparatively slower. Hence, the greater the number of requests that can be served from the cache, the faster the overall system performance becomes. The cache memory is filled and old data gets overwritten, e.g. the cache is arranged for overwriting duplicates of data when during serving requests no cache hits occur.

In an embodiment the cache memory is arranged for selecting a duplicate to be overwritten based on a least recently used criterion. The mirror unit achieves, by providing a different address for the same region of memory, that no cache hits occur and the cache is reloaded with the new data. For example, the cache may use a 'Least-Recently-Used' cache line replacement algorithm to invalidate the older address/data cache entries that are no longer used and replace such entries with new address/data from the buffer memory. Alternatively, the cache may use a random overwrite scheme. The mirror has a positive effect because the processor may work on a first set of data, then work on second set of data using a subsequent mirror address range, and after using the last mirror address range actively invalidate the cache. Effectively only after every 2nd (or more sets of data if further mirror addresses are provided) the cache invalidation procedure has to be executed, which results in saving of 50% invalidation time (for 2 mirrors, or a proportionally higher percentage for more mirrors).

In various embodiments different numbers of mirrors may be provided as elucidated below.

Figure 2:
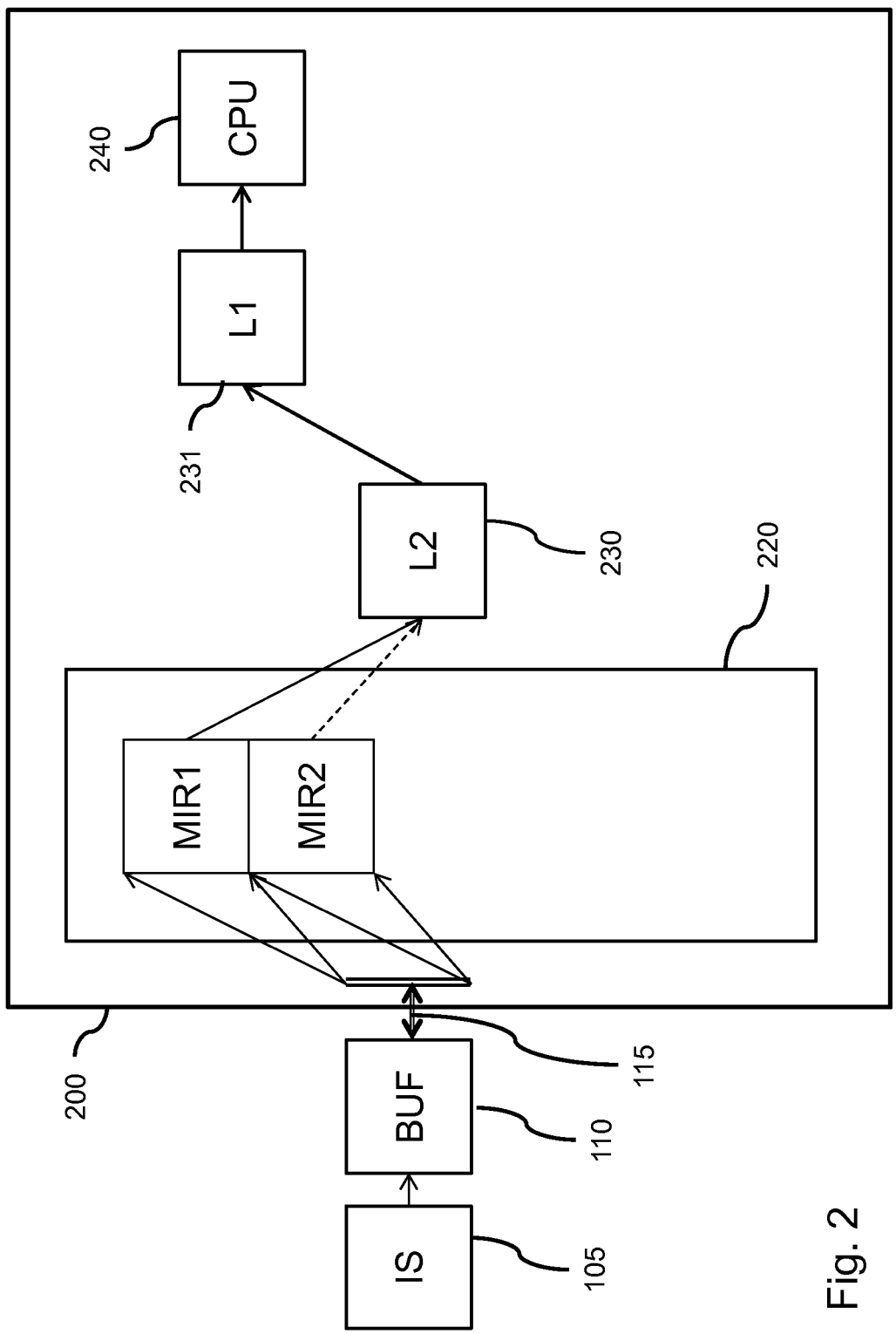
FIG. 2 shows an example of a device having two memory mirrors.

FIG. 2 shows an example of a device having two memory mirrors. The device 200 has a cache memory 230 for temporarily storing data from a buffer memory which has a buffer address range. The cache memory is shown to include a second level cache L2 and a first level cache L1. The device is coupled to a buffer memory BUF 110 via a data bus 115 similar to FIG. 1.

The device has a mirror unit 220 coupled between the cache memory 230 and the buffer memory 110. The mirror unit provides, by adapting the memory addressing, two buffer mirrors at respective first and second buffer mirror address ranges in the main address range, shown as address ranges marked MIR1, MIR2. The memory mirrors are virtual, there is no extra memory. The memory mirror is an alias for the buffer memory, e.g. a series of different addresses for the same buffer memory region. Each mirror address range has at least the same size as the buffer address range, usually the mirror address range will have the same size as the buffer address range. The mirror unit provides data on a respective address in any of the respective different buffer mirror address ranges, which is data of the buffer memory at a corresponding address in the buffer address range. Thereby the mirror unit enables processing of a subsequent set of data in the buffer memory via the cache memory while avoiding using data of a preceding set of data by switching to a different buffer mirror. A processor 240 may be included in the device. The Figure shows, by way of example, one central processing unit (CPU) coupled to the L2 cache memory via a first level cache sections 231 marked L1.

A further embodiment has more memory mirrors. Thereto the mirror unit is arranged for providing a first, a second and at least one further buffer mirror. The additional memory mirrors enable processing of the first buffer mirror after processing the second and further buffer mirrors, so again using the first mirror after processing a preceding set of data from the first buffer. To avoid using old data, during processing of intermediate buffer mirrors, a total amount of different addresses at least equal to the size of the cache memory should have been accessed before the same mirror is used again. So reuse of a first buffer is allowed after accessing, via the cache memory and while processing the second and further buffer mirrors after processing a preceding set of data from the first buffer, if a total amount of different addresses at least equal to the size of the cache memory has been accessed. In other words, the number of mirrors may be selected such that the cache has cast out old data before a mirror address is re-used. The number of mirrors may depend on the size, configuration and replacement algorithm of the cache. For a cache using "Least recently used" replacement algorithm, it would be optimal to have as many mirrors as the number of 'ways' of the cache; but this number could be less if the cache is small.

Using more than two mirrors may be effective because stale data is not actually cast out from the cache, it is just over-written by my recent data. The software would work cyclically through the memory mirrors till all are used, then start again with the first mirror. Using a few memory mirrors, there is a chance that some data may not be over-written. When that mirror is used again, stale data may still be present in the caches. More memory mirrors reduces the risk of stale data.

In a practical embodiment, the mirror unit is arranged for providing a first, a second and at least six further buffer mirrors. The total number of 8 mirrors enables processing of the first buffer mirror after accessing, via the cache memory and while processing the second and further buffer mirrors after processing a preceding set of data from the first buffer. Due to processing 8 different address ranges before reusing the first mirror, a total amount of different addresses will have been overwritten which is statistically expected to exceed the size of the cache memory. FIG. 1 shows an example of such a processing system including the device 100 having a cache memory and the buffer memory 110 coupled to an image sensor 105. The image sensor may be included in the system as well. The proposed system is applicable to any application that must process large amounts of transient data with processing elements that use caches. Applications would include any system with real time sensors that produce a lot of data, such as vision sensors, radar sensors, Lidar sensors, etc. An example may be in a car information processing system, a military or aviation system, or an industrial control and/or monitoring system.

Figure 3:
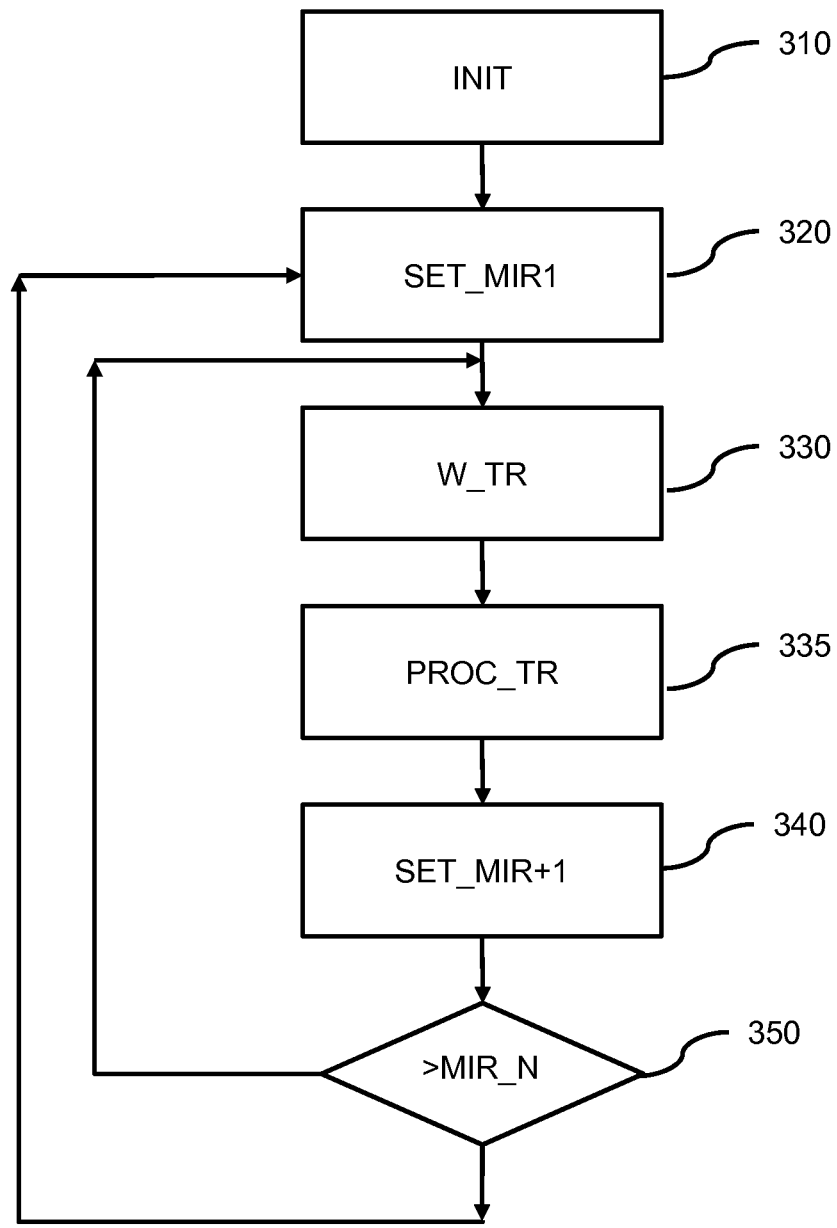
FIG. 3 shows an example of a method of processing transient data.

FIG. 3 shows an example of a method of processing transient data. The method may be used in any of the devices as described above. the method comprising processing of subsequent sets of transient data in the buffer memory via the cache memory. The method starts at stage INIT 310 by initializing the system, e.g. powering on an image sensor or configuring memory and status registers. Next, in stage SET_MIR1 320, the processing is set to start processing the transient data incoming on the buffer memory using the addressing of the first mirror, e.g. having the lowest base address. In a next stage W_TR 330 the arrival of the relevant transient in the buffer may be awaited, e.g. by waiting for an external trigger signal such as a video sync signal. Next, when the relevant data is available in the buffer, in stage PROC_TR 335 the transient data is processed using the first buffer mirror address range. Next, in a stage SET_MIR+1 340, a different mirror address range is set to be used for processing a next frame of transient data. Next, a test stage>MIR_N 350, tests whether the mirror now selected exceeds the highest available mirror number. If not, the method proceeds at step W_TR 330 by awaiting the next frame of data. If the selected mirror exceeds the highest available mirror, the method proceeds by switching to the first mirror in stage SET_MIR1 320. Effectively the method processes the buffer data from the same buffer by cyclically using different mirrors. The above stages are repeatedly executed for switching to a different buffer mirror for accessing a next set of transient data in the buffer memory via the cache memory while avoiding using data of a preceding set of data.

In a practical example a sensor moves data into a memory buffer. The data is periodically updated, e.g. every 33 ms for an image sensor @30 frames per second. The memory buffer is 'mirrored' several times by the mirror unit in the address range as perceived by the processor. The processor uses a different mirror address for each frame of data. Thereby the cache memory automatically loads new frame data, because the address is different from the cached frame address of frame data of the previous frame. In such a vision system, the buffer memory may be 6 M bytes, the L2 cache may be 1 M byte and the L1 caches may be 64K bytes. The mirrors may then also be 6 M bytes. The size of the caches and the size of the buffer may be selected independently. For example a 100K byte L2 cache with a 1 G byte buffer, or the cache and the buffer could be the same size.

The size of the caches and the structure of the caches impact how many mirrors are required, while small caches generally need fewer mirrors. Also 2 mirrors for large cache will have a performance benefit; which benefit may be greater with more mirrors. It might take extensive analysis of the cache structure and the way the data is accessed to calculate the exact minimum number of mirrors required for any given application. Without such analysis, when all the mirrors have been used once, the cache may be flushed automatically or invalidated via software.

In the foregoing specification, the invention has been described with reference to specific examples of embodiments of the invention. It will, however, be evident that various modifications and changes may be made therein without departing from the broader spirit of the invention as set forth in the appended claims. For example, the connections may be a type of connection suitable to transfer signals from or to the respective nodes, units or devices, for example via intermediate devices. Accordingly, unless implied or stated otherwise the connections may for example be direct connections or indirect connections.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. Furthermore, the units and circuits may be suitably combined in one or more semiconductor devices.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. Device having a cache memory for temporarily storing data of a buffer memory having a buffer address range,
   the cache memory being arranged for storing duplicates of data stored at respective addresses in a main address range so that future requests for data at one of the respective addresses are served faster,
   the device comprising a mirror unit coupled between the cache memory and the buffer memory, which mirror unit is arranged for
       providing at least two buffer mirrors at respective different buffer mirror address ranges in the main address range, each mirror address range having at least the same size as the buffer address range, and
       providing data at a respective address in any of the respective different buffer mirror address ranges, said data being the data of the buffer memory at a corresponding address in the buffer address range,
   for enabling processing of a subsequent set of data in the buffer memory via the cache memory while avoiding using data of a preceding set of data by switching to a different buffer mirror, and
   wherein the device comprises N processors, each processor arranged for accessing a different buffer mirror for processing of a subsequent set of data in the buffer memory via the cache memory while avoiding using data of a preceding set of data.

2. Device as claimed in claim 1, wherein the mirror unit is arranged for providing a first and a second buffer mirror,
   for enabling processing the second buffer mirror after accessing, via the cache memory and while processing the first buffer mirror after processing a preceding set of data from the second buffer, a total amount of different addresses at least equal to the size of the cache memory.

3. Device as claimed in claim 1, wherein the mirror unit is arranged for providing a first, a second and at least one further buffer mirror,
   for enabling processing of the first buffer mirror after accessing, via the cache memory and while processing the second and further buffer mirrors after processing a preceding set of data from the first buffer, a total amount of different addresses at least equal to the size of the cache memory.

4. Device as claimed in claim 3, wherein the mirror unit is arranged for providing a first, a second and at least six further buffer mirrors,
   for enabling processing of the first buffer mirror after accessing, via the cache memory and while processing the second and further buffer mirrors after processing a preceding set of data from the first buffer, a total amount of different addresses that is statistically expected to exceed the size of the cache memory.

5. Device as claimed in claim 1, wherein the cache memory is arranged for overwriting duplicates of data when during serving requests no cache hits occur.

6. Device as claimed in claim 5, wherein the cache memory is arranged for selecting a duplicate to be overwritten based on a least recently used criterion.

7. Device as claimed in claim 5, wherein the cache memory is arranged for selecting a duplicate to be overwritten based on a random overwrite scheme.

8. Device as claimed in claim 1, wherein the device comprises a buffer status unit for storing a buffer status indicative of a subsequent set of data being available in the buffer memory.

9. Device as claimed in claim 1, wherein the device comprises a processor arranged for switching to a different buffer mirror for processing of a subsequent set of data in the buffer memory via the cache memory while avoiding using data of a preceding set of data.

10. Device as claimed in claim 9, wherein the processor is arranged for cyclically switching through a sequence of available different buffer mirrors, while processing subsequent sets of data in the buffer memory.

11. Device as claimed in claim 9, wherein the cache memory is subdivided in a first level cache and a second level cache, the first level cache coupled to the processor and the second level cache coupled to the mirror unit.

12. Device as claimed in claim 11, wherein the first level cache has a size of at least one buffer mirror.

13. Integrated circuit comprising at least one electronic device according to claim 1.

14. Processing system for processing transient data comprising at least one device according to claim 1, and the buffer memory for receiving the transient data.

15. Method of processing transient data for use in a device according to claim 1, the method comprising
- processing of subsequent sets of transient data in the buffer memory via the cache memory,
- switching to a different buffer mirror for accessing a next set of transient data in the buffer memory via the cache memory while avoiding using data of a preceding set of data.

16. Method as claimed in claim 15, comprising
- cyclically switching through a sequence of available different buffer mirrors, while processing subsequent sets of transient data in the buffer memory.

* * * * *